US011418459B1

(12) United States Patent
Shateri

(10) Patent No.: US 11,418,459 B1
(45) Date of Patent: Aug. 16, 2022

(54) ANOMALY DETECTION FOR PACKET LOSS

(71) Applicant: Cigna Intellectual Property, Inc., Wilmington, DE (US)

(72) Inventor: Mahsa Shateri, Erie, PA (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 58 days.

(21) Appl. No.: 17/120,410

(22) Filed: Dec. 14, 2020

(51) Int. Cl.
| H04L 47/83 | (2022.01) |
| H04L 47/70 | (2022.01) |
| H04L 41/142 | (2022.01) |
| H04L 43/0829 | (2022.01) |
| H04L 43/067 | (2022.01) |

(52) U.S. Cl.
CPC .......... *H04L 47/823* (2013.01); *H04L 41/142* (2013.01); *H04L 43/067* (2013.01); *H04L 43/0829* (2013.01); *H04L 47/822* (2013.01)

(58) Field of Classification Search
CPC ... H04L 47/823; H04L 41/142; H04L 43/067; H04L 43/0829; H04L 47/822
See application file for complete search history.

(56) References Cited

U.S. PATENT DOCUMENTS

| 7,072,863 | B1 * | 7/2006 | Phillips | H04L 47/70 703/2 |
| 7,369,490 | B2 | 5/2008 | Zahir Azami | |
| 7,636,918 | B2 | 12/2009 | Kadashevich | |
| 7,739,143 | B1 | 6/2010 | Dwarakanath | |
| 7,765,528 | B2 | 7/2010 | Findeisen | |
| 8,219,856 | B2 | 7/2012 | Martinez | |
| 8,234,229 | B2 | 7/2012 | Castelli | |
| 9,081,683 | B2 | 7/2015 | Aizman | |
| 9,104,409 | B2 | 8/2015 | Dodeja | |
| 9,189,521 | B2 | 11/2015 | Rajan | |
| 9,373,078 | B1 * | 6/2016 | Olsson | G06F 16/24565 |
| 9,542,103 | B2 | 1/2017 | Faulkner | |
| 9,817,884 | B2 | 11/2017 | Greifeneder | |

(Continued)

OTHER PUBLICATIONS

Bernacki, et al., "Anomaly detection in network traffic using selected methods of time series analysis." International Journal of Computer Network and Information Security 7.9 (2015): 10-18.

(Continued)

*Primary Examiner* — Djenane M Bayard
(74) *Attorney, Agent, or Firm* — Schwegman Lundberg & Woessner

(57) ABSTRACT

Methods and systems for performing operations comprising: accessing one or more data objects including a data set that has been collected over a given span of time, the data set representing resource utilization of a given server; generating a first model based on a moving average of a subset of data points in the data set; generating a second model based on a historical value of a given data point in the data set, the given data point having been collected on a prior time period that corresponds to the given time period; combining the first and second models into a third model that provides an expected measure of resource utilization of the given server; and triggering an anomaly detection operation in response to determining that current resource utilization of the given server fails to correspond to the expected measure of resource utilization of the given server.

21 Claims, 7 Drawing Sheets

(56) References Cited

U.S. PATENT DOCUMENTS

| | | | |
|---|---|---|---|
| 9,875,169 B2 | 1/2018 | Ashby, Jr. | |
| 9,930,566 B2 | 3/2018 | Dribinski | |
| 10,038,602 B2 | 7/2018 | Chen | |
| 10,171,371 B2 | 1/2019 | Anwar | |
| 10,360,024 B2 | 7/2019 | Howard | |
| 10,411,969 B2 | 9/2019 | Srivastava | |
| 10,521,289 B2 | 12/2019 | Adamson | |
| 2002/0198985 A1 | 12/2002 | Fraenkel | |
| 2006/0136504 A1 | 6/2006 | Babutzka | |
| 2007/0006177 A1* | 1/2007 | Aiber | G06Q 10/10 717/136 |
| 2008/0178189 A1 | 7/2008 | Findeisen | |
| 2008/0244576 A1 | 10/2008 | Kwon | |
| 2008/0250276 A1 | 10/2008 | Martinez | |
| 2009/0198559 A1 | 8/2009 | Wang | |
| 2011/0276840 A1 | 11/2011 | Fresson | |
| 2013/0311614 A1 | 11/2013 | Salkintzis | |
| 2016/0350671 A1* | 12/2016 | Morris, II | G05B 23/0229 |
| 2017/0034297 A1 | 2/2017 | Waheed | |
| 2019/0028537 A1 | 1/2019 | Krishna Singuru | |
| 2019/0319868 A1 | 10/2019 | Svennebring | |
| 2020/0106677 A1 | 4/2020 | Pathak | |
| 2020/0106861 A1 | 4/2020 | Heiser | |
| 2020/0134423 A1* | 4/2020 | Shinde | G06F 11/3447 |
| 2020/0327456 A1* | 10/2020 | Sathe | G06K 9/6231 |
| 2020/0371892 A1 | 11/2020 | Huang | |
| 2021/0026698 A1 | 1/2021 | Lemberg | |

OTHER PUBLICATIONS

Moussas, et al. "Network traffic modeling and prediction using multiplicative seasonal ARIMA models." Proceedings of the 1st International Conference on Experiments/Process/System Modeling/Simulation/Optimization, Athens. 2005.

Szmit, et al., "Usage of modified Holt-Winters method in the anomaly detection of network traffic: Case studies" Journal of Computer Networks and Communications 2012 (2012).

* cited by examiner

ANOMALY DETECTION FOR PACKET LOSS

BACKGROUND

Users are increasingly using the Internet, such as websites, to access information and perform transactions. As more and more services become available over the Internet, the load placed on servers that host the various services increase. Identifying when the load placed on the servers reaches a critical point is important to maintaining and providing a high quality of service to the end users with minimal data loss or lag.

DETAILED DESCRIPTION

Figure 1:
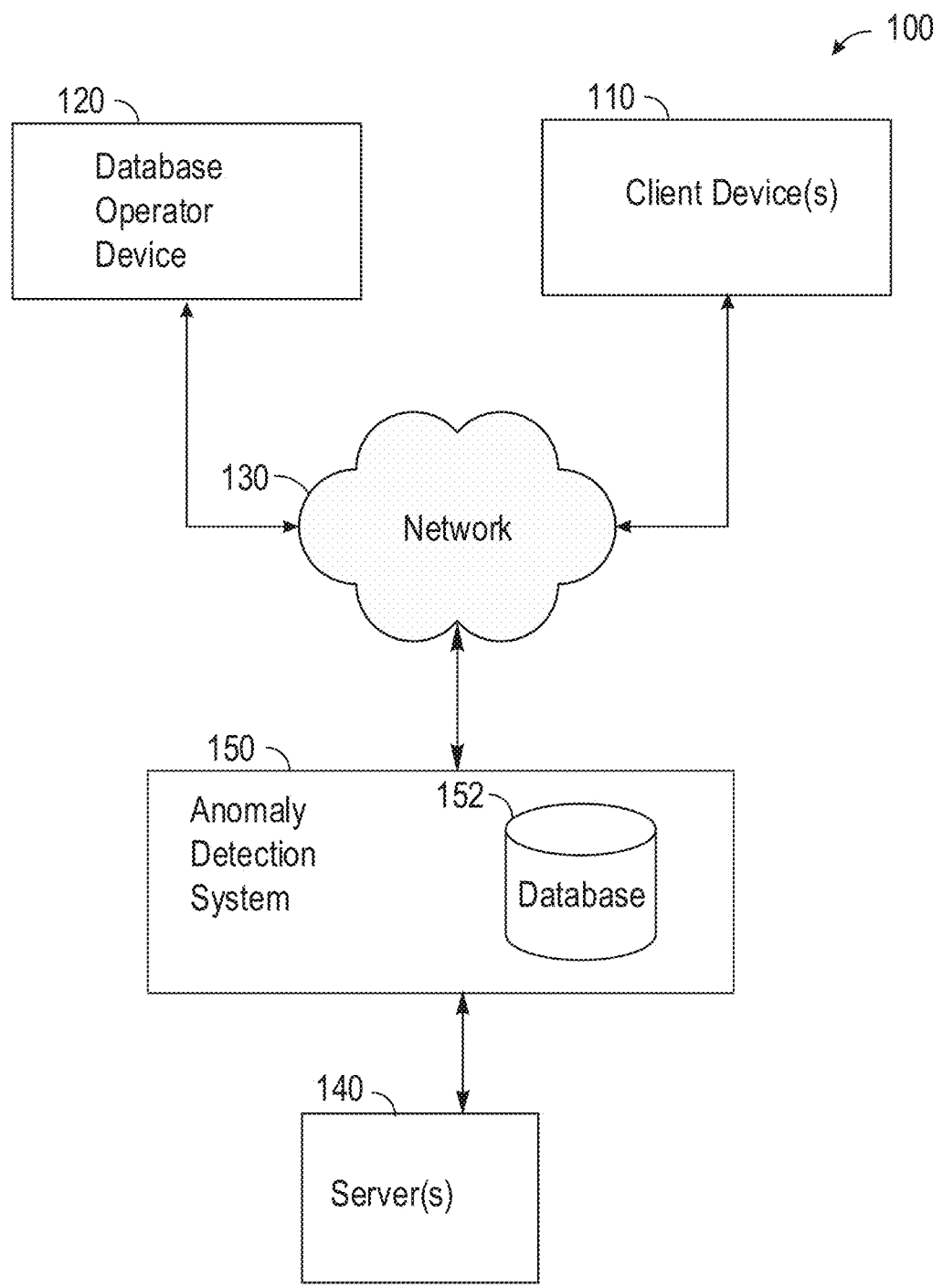
FIG. 1 is a block diagram of an example anomaly detection system, according to some embodiments.

Example methods and systems for an anomaly detection system are described. In the following description, for purposes of explanation, numerous specific details are set forth in order to provide a thorough understanding of example embodiments. It will be evident, however, to one of ordinary skill in the art that embodiments of the invention may be practiced without these specific details.

Online transactions typically consume resources of one or more servers. Such resources include memory, bandwidth, and processors allocated to various services hosted by the servers. The amount of resources that each server can allocate is physically limited and load on the servers varies over time. For example, in the morning hours on Mondays, the load on the servers may be very high whereas over the weekend the load on the servers may be very low. As such, over time, the servers need to re-allocate the resources based on the needs. Allocating insufficient resources for a given service on the servers can result in increased amount of data packet losses which can introduce lag on the services the end users access. At the same time, over-allocating resources for a given service on the servers, can result in starving other services from accessing resources which degrades the end-user experience for users accessing the other services. Identifying the proper amount of resource utilization for a given service or application on various servers can be key to maintaining a high quality of service.

The disclosed embodiments provide systems and methods to identify resource utilization anomalies, such as abnormal behavior to automatically or manually trigger an anomaly detection operation, such as, e.g., a message to an operator or re-allocation of server resources. The disclosed embodiments are discussed in relation to server query language (SQL) type servers and should be understood to be similarly applicable to any other type of server or resource. Specifically, the disclosed embodiments access one or more data objects including a data set that has been collected over a given time interval representing resource utilization of a given server by one or more services or applications. A first model is generated based on a moving average of a recent subset of data points in the data set collected over a first time interval on a given time period (e.g., a given day) and a second model is generated based on a historical value of a given data point in the data set having been collected on a prior time period (e.g., prior day) that corresponds to the given time period, such as on a previous day or on a prior week at the same day and time. The first and second models can be combined, at least in part, into a third model that provides an expected measure of resource utilization of the given server and an anomaly detection operation can be triggered in response to determining that current resource utilization of the given server fails to correspond to the expected measure of resource utilization of the given server.

In this way, rather than waiting for the resources of a given server to be exceeded resulting in greater than allowable packet loss to occur, the disclosed embodiments can detect abnormal behaviors of the resource utilization and can generate an anomaly detection operation to address the abnormal behavior. This allows resources of a server to be reallocated more quickly and efficiently which improves, e.g., the quality of service an end user experiences.

FIG. 1 is a block diagram showing an example system 100 according to various exemplary embodiments. The system 100 can be a server system that allocates resources, such as memory, bandwidth, and processors, to one or more services hosted by the servers for consumption by one or more client devices 110. The system 100 includes one or more client devices 110, a database operator device 120, an anomaly detection system 150, and one or more servers 140 that are communicatively coupled over a network 130 (e.g., Internet, telephony network).

As used herein, the term "client device" may refer to any machine that interfaces to a communications network (such as network 130) to obtain resources from one or more servers 140. The client device 110 may be, but is not limited to, a mobile phone, desktop computer, laptop, portable digital assistants (PDAs), smart phones, a wearable device (e.g., a smart watch), tablets, ultrabooks, netbooks, laptops, multi-processor systems, microprocessor-based or programmable consumer electronics, game consoles, set-top boxes, or any other communication device that a user may use to access a network or a service hosted by the servers 140.

The network 130 may include, or operate in conjunction with, an ad hoc network, an intranet, an extranet, a virtual private network (VPN), a local area network (LAN), a wireless network, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The servers 140 host one or more services that are accessed by the client devices 110. For example, the servers 140 host a teleconference or video conference service that enables multiple client devices 110 to communicate with each other. To instantiate and enable the teleconference or video conference service, the teleconference or video conference service can be allocated memory, bandwidth and processing resources of the server 140. The amount of resources that need to be allocated to the teleconference or video conference service can grow over time or shrink over time depending on various factors, such as the number of users of the services at a given time. In some instances, when many client devices 110 request access to the services hosted by the servers 140, the resource allocations of the server 140 can grow rapidly beyond an expected amount that result in a greater than allowable packet loss. These can be classified as abnormal behaviors of the resource utilization of the servers 140 which can be addressed in many ways. One way to address these abnormal behaviors is to re-allocate resources of the servers 140 from another service to the service on which an increased amount of packet loss occurs (or changes or otherwise impacts one or more other parameters, such as TCP throughput or round trip times). TCP throughput refers to the amount of data that can be transmitted over a link over a given time interval. Round trip times refers to the amount of time a given packet of data takes to reach a destination from an origin plus the time it takes for an acknowledgment of that packet to be received back at the origin. In some cases, packet loss, TCP throughput and round trip times are generally referred to as parameters representing resource utilization of a given server. Other ways to address these abnormal behaviors can be contemplated.

The anomaly detection system 150 monitors the resource utilization of the servers 140 (e.g., including the parameters, such as packet loss, TCP throughput and round trip times). The anomaly detection system 150 analyzes the resource utilization over a given time interval to detect the abnormal behaviors. For example, the anomaly detection system 150 accesses one or more data objects including a data set that has been collected over a given time interval and generates first and second models for the data. The data that is accessed may represent an amount of packet loss that is encountered or that occurs at a given time point (e.g., in a 10 minute interval). The first model can consider the average of the previous six data points (e.g., recently occurring packet loss on a given time period (a given day), such as the amount of packet loss that occurred in the past hour or the most recent hour, such as between 5-6 PM when the current time is 6 PM) and perform exponential smoothing with the load parameter of 15% to find estimated packet loss value (threshold) of next event.

Namely, the first model can consider recent fluctuations of data. The second model can consider seasonality patterns in the data by analyzing, for example, the amount of packet loss that occurred during the previous time period (e.g., previous day or at the same day and time on a previous week). In some cases, exponential smoothing with load parameter of 15% can be used for the second model. The first and second models can be combined, at least in part, such as by averaging the outputs of the first and second models, to generate a third model. The third model can provide an expected resource utilization measure, such as an expected threshold amount of packet loss, that is estimated to occur at a current time and/or at a time point in the future. The anomaly detection system 150 can compare the current resource utilization on a given server and, in some cases, by a given service, with the expected resource utilization measure provided by the third model. In response to determining that the current resource utilization (e.g., the current amount of packet loss) exceeds the expected resource utilization measure (e.g., the expected amount of packet loss or threshold amount of packet loss), the anomaly detection system 150 can trigger an anomaly detection operation indicating abnormal behavior on a given server.

As an example, in such instances, the anomaly detection system 150 transmits a communication to a database operator device 120 that identifies the server 140 on which the abnormal behavior was detected. The database operator device 120 can present a prompt to a database operator that identifies the server 140 on which the abnormal behavior was detected and provides an option to address the abnormal behavior. For example, the database operator device 120 can include a change resources option that allows the operator to allocate more or less resources to a given application or service hosted by the server 140 on which the abnormal behavior was detected.

In some embodiments, the first, second and third models are generated on a per server of the servers 140 basis. In such cases, a first collection of models that include the first, second and third models are generated for a first server 140 that is at a first location. A second collection of models that include the first, second and third models are generated for a second server 140 that is at a second location. Each collection of models is generated based on data accessed and collected from the respective first or second server 140. In some embodiments, the first, second and third models can be generated on a per service or application hosted by the servers 140 basis. In such cases, a first collection of models that include the first, second and third models are generated for a first service hosted by a given server 140 and a second collection of models that include the first, second and third models are generated for a second service hosted by a given server 140. Current resource utilization and/or packet loss occurring or encountered by a given service or application can be compared with the output of the third model associated with the given service or application to detect an anomaly or abnormal behavior and to trigger the anomaly detection operation.

In some embodiments, the anomaly detection system 150 generates one or more data objects including a data set that includes a history of resource utilizations, such as a plurality of resource utilizations of server 140 over a given time interval. The resource utilizations can be indicative or include the total number of packet losses experienced or detected by the server 140 during the given time interval. For example, the anomaly detection system 150 captures a collection of data at a capture rate. Specifically, at each point in time within a capture rate (e.g., every ten minutes), the anomaly detection system 150 can query a given server 140 to obtain the current resource utilization (e.g., the current amount of packet loss) experienced by the server 140. The anomaly detection system 150 can store the current resource utilization of the given server 140 in the database 152. In some cases, rather than capturing the resource utilization data every ten minutes, the anomaly detection system 150 obtains the resource utilization of the given server 140, e.g., once every minute. Indeed, anomaly detection system 150 may obtain the resource utilization of the server 140 at other time intervals as appropriate (e.g., once every five minutes, once every 20 minutes, and the like), all of which are within the scope of the present disclosure. The anomaly detection system 150 can then collect a set of, e.g., ten data points that have been collected over the past ten minutes and aggregates them (e.g., computes a sum and/or average and/or median value of the past ten data points) into a given data point. In this way, a single data point in a collection represents resource utilization of a server 140 across a ten minute interval. In some cases, 90 days' worth of data can be gathered on a per server 140 basis to generate the first, second and third models.

In some embodiments, the anomaly detection system 150 generates the first model according to Equation 1 below:

$$y_{tl,ml,hl,wl} = \begin{cases} \dfrac{\sum_{tl=1,n\leq\beta}^{tl=n} x_{tl,ml,hl,wl}}{n} \\ \dfrac{\sum_{tl=tl-\beta-1,n>\beta}^{tl=tl-1} x_{tl,ml,hl,wl}}{\beta} \end{cases}$$

$$\forall\, tl\epsilon T,\, ml\epsilon M,\, hl\epsilon H,\, wl\epsilon W,\, l\epsilon L$$

$$F^1_{tl,ml,hl,wl} = \begin{cases} y_{tl=1,ml,hl,wl} \\ \alpha_1 \cdot y_{tl-1,ml,hl,wl} + (1-\alpha_1) \cdot F^1_{tl-1,ml,hl,wl},\, tl>1 \end{cases}$$

$$\forall\, tl\epsilon T,\, ml\epsilon M,\, hl\epsilon H,\, wl\epsilon W,\, l\epsilon L$$

where $x_{tl,ml,hl,wl}$ is the actual historical value at time t, quarter m (15 minute interval), hour h, weekday w, and location l; $\alpha_1$ is the exponential smoothing load parameter for the dataset, which can be set to a value of 0.15; $\beta$ is the historical data points for the moving average, wherein in Equation 1 the value of $\beta$ is set to 6 data points accumulated in 10 minute time intervals; n is the number of historical data points for the moving average; tl is the events occurring at a 10 minutes time interval t and location l; T represents all the 10 minute time intervals in the past hour; ml represents every quarter m of an hour at a location l, where in Equation 1 M is set to three (20 minute quarters); wl represents the weekday w at location l, where in Equation 1, the W parameter is set to 7 for sever days in the week, L is the total number of locations in servers 140. The first model may provide a moving average and first degree exponential smoothing of the collected data for a given server or service. Based on these values and parameters, the first model $F^1_{tl,ml,hl,wl}$ provides an estimated threshold value (e.g., threshold packet loss or resource utilization) for the next set of events based on very recent data (e.g., data that is representative of the past hour of packet loss or resource utilization). The anomaly detection system 150 can store the first model in models 220 in database 152.

While the first model can consider recent fluctuations in data (e.g., recent packet losses or resource utilizations), the second model can consider patterns in the data on a per location, time of day, and day of the week basis. Namely, the second model can consider the behavior of the packet losses or resource utilization on a seasonality basis (e.g., there are usually more packet losses during heavy load conditions on early Monday mornings as opposed to minimal packet losses over the weekend). In an embodiment, the anomaly detection system 150 generates the second model according to Equation 2 below:

$$F^2_{tmhwl} = \begin{cases} x_{tmhwl=1} \\ \alpha_2 \cdot x_{(t-1)mhwl} + (1-\alpha_2) \cdot F^2_{(t-1)mhwl},\, tmhwl>1 \end{cases}$$

$$\forall\, tmhwl\epsilon T,\, m\epsilon M,\, h\epsilon H,\, w\epsilon W,\, l\epsilon L$$

where $\alpha_2$ represents the exponential smoothing load parameter for the second model, in Equation 2, this parameter can be set to a value of 0.15; $x_{tmhwl}$ represents the actual historical value at time t, quarter m, hour h, weekday w, and location l; tmhwl represents the time interval associated with similar time interval t, quarter m, hour h, and weekday w, for location l (e.g., tmhwl can be the same time as the current time in the past week, such as 9 AM on Tuesday last week when the current time is 9 AM on Tuesday). The second model may provide a triple degree exponential smoothing of the collected data for a given server or service. Based on these values and parameters, the second model $F_{tmhwl}^2$ can provide an estimated threshold value for the next set of events based on the historical pattern of data or seasonality of the data for similar time intervals during, e.g., the time of day, quarter of hour, day of the week per location. The anomaly detection system 150 can store the second model in models 220 in database 152.

In an embodiment, the anomaly detection system 150 generates the third model according to Equation 3 below:

$$F^3_{tl,ml,hl,wl} = \frac{(F^1_{tl,ml,hl,wl} + F^2_{tmhwl})}{2}$$

$$\forall\, tl\epsilon T,\, ml\epsilon M,\, hl\epsilon H,\, wl\epsilon W,\, l\epsilon L$$

Specifically, the third model can provide an average of the outputs of the first and second models defined by Equations 1 and 2 above. In this way, the third model takes into account both the seasonality of the data (e.g., how the data behaved on a prior day or at the same time on a prior week) and the recency of the data (e.g., how the data is behaving in the past hour or very recently—a time point that is less than a threshold amount of time or shorter than an entire day). The anomaly detection system 150 can store the third model in models 220 in database 152.

In some embodiments, the anomaly detection system 150 computes an upper bound and lower bound for the resource utilization based on the outputs of the first, second and third models and based on deviation or variance of the collected data. Namely, the anomaly detection system 150 can use the upper bound to provide an allowable range by which the current resource utilization can exceed the predicted or estimated resource utilization output by the first, second and/or third models. To compute the upper and lower bounds, the anomaly detection system 150 may first generate a deviation factor according to Equation 4 below:

$$\text{DeviationFactor}_{tmhwl} = \max(\text{avg}_{tmhwl}, \text{md}_{tmhwl})$$

where $m_{mhwl}$ represents the median value of events that occurred during the quarter m, hour h, weekday w, and location l in the entire set of collected data; $md_{tmhwl}$ represents the median deviation of each value against $m_{tmhwl}$ for the time interval t, during quarter m, hour h, weekday w, and location l; and $avg_{tmhwl}$ represents the average deviation of each value against $md_{tmhwl}$ represents for the time interval t, during quarter m, hour h, weekday w, and location l. Namely, the deviation factor can be computed based on a maximum between the average deviation of the values in the data set and the median deviation of the data set.

To ensure the fluctuation in recent events have been considered fully, the variation of data in the past few data points can also be considered. The anomaly detection system 150 can compute a range of variation $R_{tl,ml,hl,wl}$ in the recently collected data points (e.g., the data points representing packet loss that occurred on a given server 140 in the past hour or at some point in time within a current day) and the average of the variation of the recently collected data points $avg_{tl,ml,hl,wl}$. These two parameters can be computed in accordance with Equation 5 below:

$$R_{tl,ml,hl,wl} = \max(\Delta_{tl,ml,hl,wl}) - \min(\Delta_{tl,ml,hl,wl})$$

$$\forall\, l \in T_2,\, ml \in M_2,\, hl \in H_2,\, wl \in W_2,\, l \in L$$

$$avg_{tl,ml,hl,wl} = \frac{\sum_{v=1}^{v=V} \Delta_{tl,ml,hl,wl}}{V}$$

$$\forall\, l \in T,\, ml \in M,\, hl \in H,\, wl \in W,\, l \in L$$

$$\Delta_{((tl-1),ml,hl,wl-(tl-v),ml,hl,wl)} = \begin{cases} 0, & \text{if } tl > V \\ |x_{(tl-1),ml,hl,wl} - x_{(tl-v),ml,hl,wl}|, & \text{if } tl \leq V \end{cases}$$

$$\forall\, v \in V,\, l \in T,\, ml \in M,\, hl \in H,\, wl \in W,\, l \in L$$

where v is the previous data points; V is the maximum previous data points considered and $\Delta_{((tl-1),ml,hl,wl-(tl-v),ml,hl,wl)}$ represents the variation in the past recently collected data points or the delta of packet loss value for previous events against the most recent event.

Combining the modified median absolute deviation for similar historical time intervals based on, e.g., hour of day, quarter of hour, and weekday as well as the most recent events by location can provide a reasonable estimate for upper and lower KPI values or bounds for the next set of events. In some embodiments, the anomaly detection system 150 computes the future or next event's upper bound value for time interval t, hour of the day h, quarter of hour m, weekday w, and location l based on the modified median deviation (e.g., based on the outputs of Equations 4 and 5) according to Equation 6 below:

$$F\_UB\_Median_{tl,ml,hl,wl} =$$

$$m_{mhwl} + \max(DeviationFactor_{tmhwl},\, R_{tl,ml,hl,wl},\, avg_{tl,ml,hl,wl})$$

$$\forall\, l \in T,\, ml \in M,\, hl \in H,\, wl \in W,\, l \in L$$

In some embodiments, the anomaly detection system 150 computes the future or next event's lower bound value for time interval t, hour of the day h, quarter of hour m, weekday w, and location l based on the modified median deviation (e.g., based on the outputs of Equations 4 and 5) according to Equation 7 below:

$$F\_LB\_Median_{tl,ml,hl,wl} =$$

$$m_{mhwl} + \min(DeviationFactor_{tmhwl},\, R_{tl,ml,hl,wl},\, avg_{tl,ml,hl,wl})$$

$$\forall\, l \in T,\, ml \in M,\, hl \in H,\, wl \in W,\, l \in L$$

In some embodiments, the anomaly detection system 150 combines the outputs of Equations 6 and 7 to generate a fourth model that forecasts threshold values for a next set of events in the future at a given location and/or per given service or application. Specifically, the anomaly detection system 150 generates a fourth model according to Equation 8 below:

$$F^4_{tl,ml,hl,wl} = \begin{cases} F\_LB\_Median_{tl,ml,hl,wl}, & \text{if } hl \in \{8, 9, 10\} \\ \min(F\_UB_{Median_{tl,ml,hl,wl}},\, (F\_LB_{Median_{tl,ml,hl,wl}} + F^3_{tl,ml,hl,wl})) \end{cases}$$

$$\forall\, tmhwl \in T,\, m \in M,\, h \in H,\, w \in W,\, l \in L$$

In one example, the fourth model outputs as the estimated resource utilization or forecasted resource utilization the output of Equation 7 which provides the lower bound for a given set of hours in the day (e.g., at 8 AM, 9 AM and 10 AM), and otherwise uses the output of a minimum of Equation 6 and a combination of Equation 7 and the third model. So if the current hour is, e.g., 8, 9 or 10, the anomaly detection system 150 relies on the output of Equation 7 against which to compare the current resource utilization and otherwise if the current hour is not 8, 9 or 10, the anomaly detection system 150 compares the current resource utilization to the minimum of Equation 6 and a combination of Equation 7 and the third model.

The anomaly detection system 150 can compute a lower bound KPI value for the next set of events for time interval t, hour h, quarter of m, and weekday of w, for unique location l according to Equation 9 below:

$$LB_{tl,ml,hl,wl} = \min(F^1_{tl,ml,hl,wl},\, F^2_{tmhwl},\, F^4_{tl,ml,hl,wl} LB\_Median_{tl,ml,hl,wl})$$

$$\forall\, l \in T,\, ml \in M,\, hl \in H,\, wl \in W,\, l \in L$$

The anomaly detection system 150 can compute the upper bound KPI values for the next set of events where the upper bound is limited to the maximum of two times of the forecasted threshold value according to Equation 10 below:

$$UB\_1_{tl,ml,hl,wl} = \max(F^4_{tl,ml,hl,wl},$$

$$F^1_{tl,ml,hl,wl} + F\_UB_{Median_{tl,ml,hl,wl}},\, F^2_{tmhwl} + F\_UB_{Median_{tl,ml,hl,wl}},$$

$$m_{mhwl} + DeviationFactor_{tmhwl} + F\_UB_{Median_{tl,ml,hl,wl}})$$

$$\forall\, l \in T,\, ml \in M,\, hl \in H,\, wl \in W,\, l \in L$$

$$UB_{tl,ml,hl,wl} =$$

$$\begin{cases} \min(\max(x_{tl,ml,hl,wl}),\, 2*UB\_1_{tl,ml,hl,wl}), & \text{if } UB\_1_{tl,ml,hl,wl} > 2F^4_{tl,ml,hl,wl} \\ UB\_1_{tl,ml,hl,wl} \end{cases}$$

$$\forall\, l \in T,\, ml \in M,\, hl \in H,\, wl \in W,\, l \in L$$

In some embodiments, the anomaly detection system 150 computes a difference between the upper bound (e.g., the output of Equation 10) and the current resource utilization for a most recently collected set of data points. The anomaly detection system 150 can trigger the anomaly detection operation in response to determining that a majority of the differences exceed a threshold value. For example, if two out of the past three data points exceed the output of Equation 10, the anomaly detection system 150 triggers the anomaly detection operation.

In some embodiments, the anomaly detection system 150 can consider a plurality of parameters collected over a historical span of time (e.g., 60-day period) and respectively collected current resource utilization data to trigger the anomaly detection operation. For example, rather than only considering packet loss to trigger the anomaly detection operation, the anomaly detection system 150 considers packet loss, TCP throughout and round trip tips at each server or on a per server basis to trigger the anomaly detection operation. This may result in a more reliable measure of an anomaly than triggering the anomaly detection operation based on packet loss alone.

In such implementations, the anomaly detection system 150 obtains one or more data objects including a data set that has been collected over a given span of time, the data set representing a plurality of parameters corresponding to resource utilization of a given server. The anomaly detection system 150 computes a first statistical measure (e.g., one or more quantiles comprising a $5^{th}$ percentile measure, $90^{th}$ percentile measure, a $95^{th}$ percentile measure, and a $98^{th}$ percentile measure) for each parameter of the plurality of parameters. Specifically, the anomaly detection system 150 analyzes a collection of data over a 60-day period and computes the first statistical measure (e.g., one or more quantiles comprising a $5^{th}$ percentile measure, $90^{th}$ percentile measure, a $95^{th}$ percentile measure, and a $98^{th}$ percentile measure) for a first parameter (e.g., packet loss) and stores this computed statistical measure in association with the first parameter. The anomaly detection system 150 analyzes the collection of data over a 60-day period and computes the first statistical measure for a second parameter (e.g., TCP throughput) and stores this computed statistical measure in association with the second parameter. The anomaly detection system 150 analyzes the collection of data over a 60-day period and computes the first statistical measure for a third parameter (e.g., round trip times) and stores this computed statistical measure in association with the second parameter. The anomaly detection system 150 can perform such computations for each server of a plurality of servers.

The anomaly detection system 150 obtains a current set of values representing current resource utilization of a given server. The current set of values represent the current packet loss, current TCP throughput and current round trip times at the given server. The anomaly detection system 150 can retrieve the first statistical measure computed based on the historical data for the given server for the first, second and third parameters.

The anomaly detection system 150 can compare the current packet loss to an upper bound or lower bound defined by the first statistical measure associated with historical data for the first parameter. For example, the anomaly detection system 150 can compare the current packet loss to the $95^{th}$ percentile value of the historical packet loss. The anomaly detection system 150 may also compare the current packet loss to the $5^{th}$ percentile value of the historical packet loss. The anomaly detection system 150 can compare the current TCP throughput to an upper bound or lower bound defined by the first statistical measure associated with historical data for the second parameter. For example, the anomaly detection system 150 can compare the current TCP throughput to the $90^{th}$ percentile value of the historical TCP throughput. The anomaly detection system 150 may also compare the current TCP throughput to the $5^{th}$ percentile value of the historical TCP throughput. The anomaly detection system 150 can compare the current round trip times to an upper bound or lower bound defined by the first statistical measure associated with historical data for the third parameter. For example, the anomaly detection system 150 can compare the current round trip times to the $99^{th}$ percentile value of the historical round trip times. The anomaly detection system 150 may also compare the current round trip times to the $5^{th}$ percentile value of the historical round trip times.

The anomaly detection system 150 can trigger the anomaly detection operation in response to determining that a condition is satisfied in which the current resource utilization data for the given server exceeds the respective thresholds defined by the first statistical measure of the respective parameters determined from the historical data. As an example, if the current packet loss exceeds the $95^{th}$ percentile value of the historical packet loss and/or if the current packet loss is lower than the $5^{th}$ percentile value of the historical packet loss; if the current TCP throughput exceeds the $90^{th}$ percentile value of the historical packet loss and/or if the current TCP throughput is lower than the $5^{th}$ percentile value of the historical TCP throughput; and if the current round trip times exceeds the $99^{th}$ percentile value of the historical round trip times and/or if the current round trip times is lower than the $5^{th}$ percentile value of the historical round trip times, then the anomaly detection system 150 can trigger the anomaly detection operation.

As another example, the anomaly detection system 150 can trigger the anomaly detection operation in response to determining that a second condition in which values of the data set corresponding to a time period associated with the current resource utilization exceed a second threshold associated with the second statistical measure. For example, the anomaly detection system 150 can trigger the anomaly detection operation at a time in which a location or server experiences two of the three parameters falling outside of their upper or lower bounds (defined by the first statistical measure) while the difference between the actual and median over all the historical values for a specific location, hour of day, and weekday is greater than the median absolute deviation value for both parameters among all historically captured data for that location, hour of day, and weekday.

Specifically, the anomaly detection system 150 can obtain a first set of values corresponding to a first parameter of the plurality of parameters (e.g., the current packet loss). The anomaly detection system 150 can obtain a second set of values corresponding to a second parameter of the plurality of parameters (e.g., the current TCP throughput). The anomaly detection system 150 can obtain a third set of values corresponding to a third parameter of the plurality of parameters (e.g., the current round trip times). The anomaly detection system 150 can determine that at least two of the first, second and third sets of values exceed respective standard deviations associated with the first statistical measure. For example, the anomaly detection system 150 can determine that any combination of two or more of the current packet loss, current TCP throughput, and current round trip times exceed the upper or lower bounds (defined by the first statistical measure based on the historical packet loss, historical TCP throughput and historical round trip times). Namely, the anomaly detection system 150 can determine that the current packet loss exceeds the $95^{th}$ percentile value of the historical packet loss and/or that the current packet loss is lower than the $5^{th}$ percentile value of the historical packet loss; and that the current round trip times exceeds the $99^{th}$ percentile value of the historical round trip times and/or the current round trip times is lower than the $5^{th}$ percentile value of the historical round trip times. In such cases, the anomaly detection system 150 can trigger the anomaly detection operation if another condition in which values of the historical data set corresponding to a time period associated with the current resource utilization exceed the second threshold associated with the second statistical measure.

As an example, to determine that the values of the historical data set corresponding to a time period associated with the current resource utilization exceed the second threshold associated with the second statistical measure, the anomaly detection system 150 can determine the parameters corresponding to those in which the current resource utilization parameters exceed the first statistical measure. For example, if the current packet loss exceeds the $95^{th}$ percentile value of the historical packet loss and/or if the current packet loss is lower than the $5^{th}$ percentile value of the historical packet loss; and if the current round trip times exceeds the $99^{th}$ percentile value of the historical round trip times and/or if the current round trip times is lower than the $5^{th}$ percentile value of the historical round trip times, then the anomaly detection system 150 can select from the plurality of parameters the packet loss parameter and the round trip times parameter. The anomaly detection system 150 can then search the historical data for the values associated with the selected plurality of parameters. The anomaly detection system 150 filters the historical data corresponding to the selected plurality of parameters based on a current time period. For example, the anomaly detection system 150 can identify from the historical data for the selected plurality of parameters the data points that fall on the same time of day or hour of the day on the same day of the week as the current time of day or current day of the week represented by the current resource utilization data.

The anomaly detection system 150 can compute a first plurality of differences between each of a first plurality of the identified historical data points corresponding to a first of the selected plurality of parameters and a median of the first plurality of the identified historical data points. For example, the anomaly detection system 150 can compute differences for the historical packet loss points that occurred at the same time of day or hour of the day on the same day of the week as the current time of day or current day of the week and the median values of the historical packet loss points. The anomaly detection system 150 can then compare the first plurality of differences to a first median absolute deviation value associated with the first parameter (e.g., the packet loss parameter). The median absolute deviation value can be computed in a similar manner as discussed above.

The anomaly detection system 150 can compute a second plurality of differences between each of a second plurality of the identified historical data points corresponding to a second of the selected plurality of parameters and a median of the second plurality of the identified historical data points. For example, the anomaly detection system 150 can compute differences for the historical round trip times points that occurred at the same time of day or hour of the day on the same day of the week as the current time of day or current day of the week and the median values of the historical round trip times points. The anomaly detection system 150 can then compare the second plurality of differences to a second median absolute deviation value associated with the second parameter (e.g., the round trip times parameter). The median absolute deviation value can be computed in a similar manner as discussed above.

The anomaly detection system 150 can trigger the anomaly detection operation in response to determining that the at least two of the first, second and third sets of values exceed respective standard deviations associated with the first statistical measure and in response to determining that the first plurality of differences are greater than the first median absolute deviation value associated with the first parameter and the second plurality of differences are greater than the second median absolute deviation value associated with the first parameter. As an example, the anomaly detection system 150 can trigger the anomaly detection operation in response to determining that the current packet loss exceeds the $95^{th}$ percentile value of the historical packet loss and/or that the current packet loss is lower than the $5^{th}$ percentile value of the historical packet loss; and that the current round trip times exceeds the $99^{th}$ percentile value of the historical round trip times and/or the current round trip times is lower than the $5^{th}$ percentile value of the historical round trip times; and also in response to in response to determining that the first plurality of differences (corresponding to the historical packet loss) are greater than the first median absolute deviation value (corresponding to the historical packet loss) and the second plurality of differences (corresponding to the round trip times) are greater than the second median absolute deviation value associated with the first parameter (corresponding to the round trip times).

Figure 2:
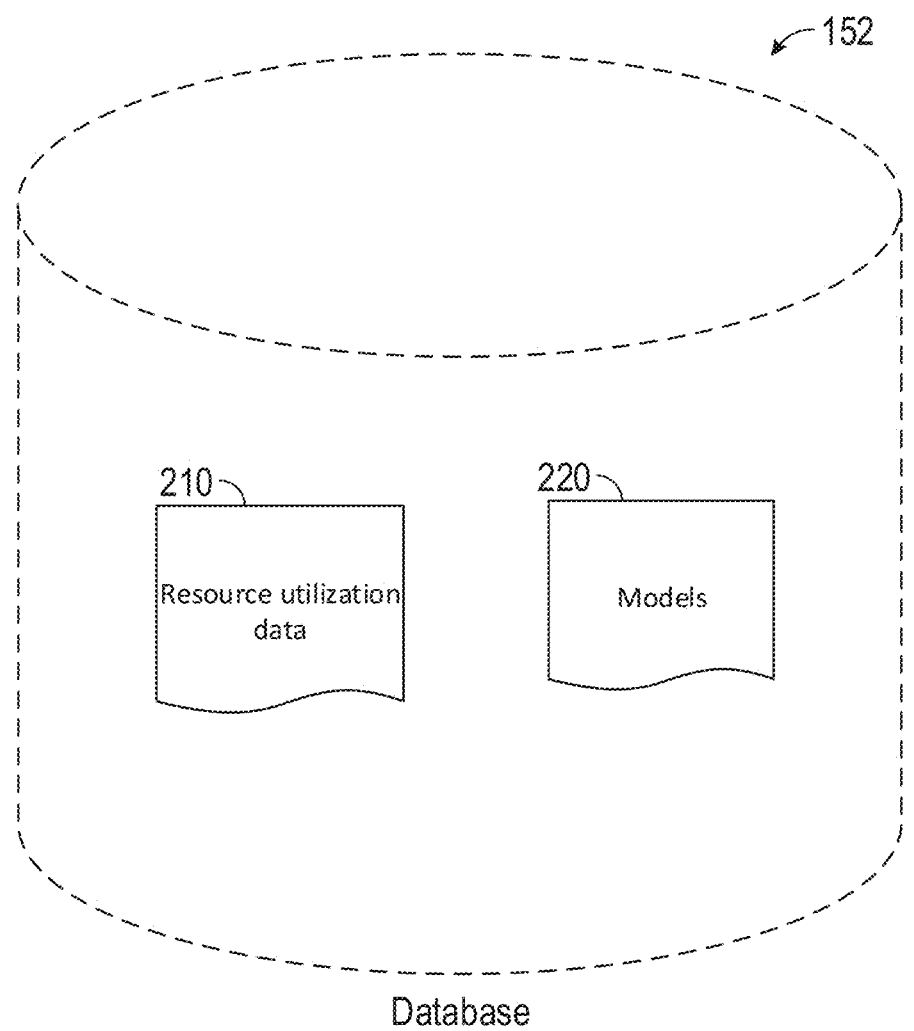
FIG. 2 is an example database that may be deployed within the system of FIG. 1, according to some embodiments.

FIG. 2 is an example database 152 that may be deployed within the system of FIG. 1, according to some embodiments. As shown, the database 152 includes resource utilization data 210 and the models 220. The resource utilization data 210 can store a collection of data points representing resource utilization, such as memory allocations, packet loss, bandwidth allocation, processor allocations, on each server 140 on a per server basis. The resource utilization data 210 includes aggregated data points, such as data collected every minute and averaged and/or summed into a single data point. The resource utilization data 210 stores 60 or 90 days' worth of resource utilization but any more or less amount of data can be maintained and tracked. Models 220 can store the first, second, third and fourth models for each of the servers 140.

Figure 3:
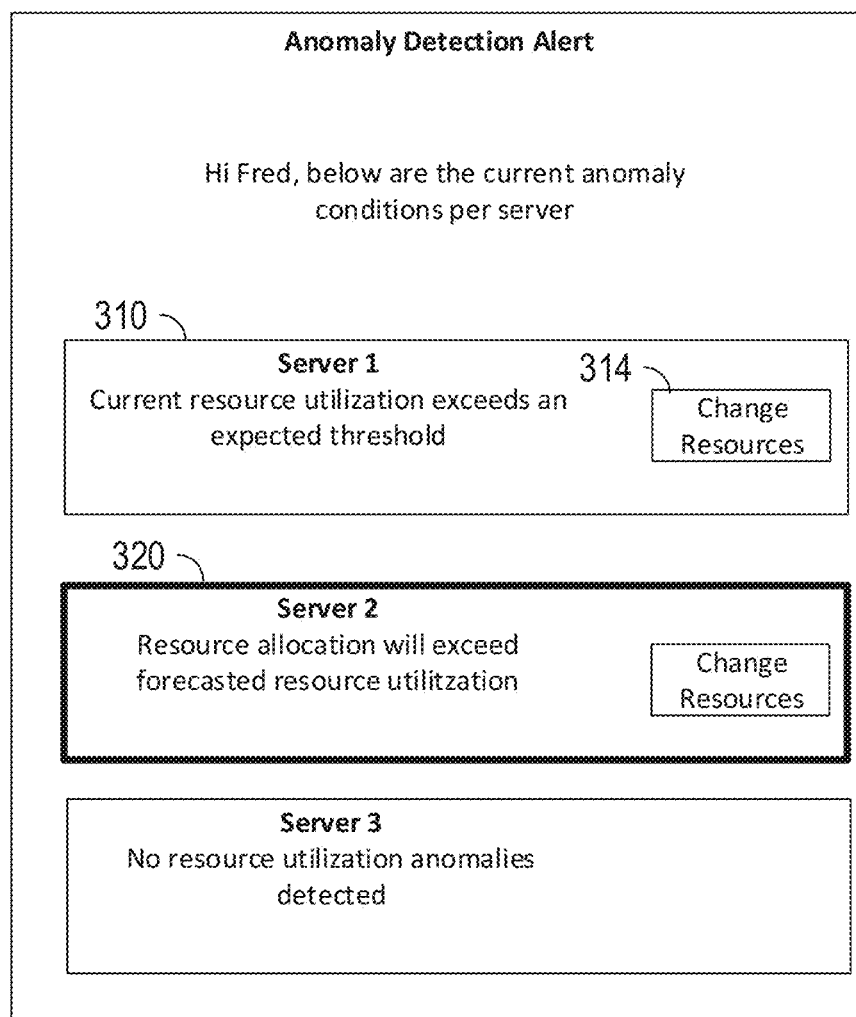
FIG. 3 is an example anomaly detection alert generated by the system of FIG. 1, according to example embodiments.

FIG. 3 is an example anomaly detection alert 300 generated by the system of FIG. 1, according to example embodiments. For example, triggering an anomaly detection operation by the anomaly detection system 150 may transmit a communication or notification to the database operator device 120 to generate the anomaly detection alert 300 in a graphical user interface of the database operator device 120. The anomaly detection alert 300 may be presented to a system or database administrator. The anomaly detection alert 300 may include information that identifies resource utilization (e.g., data packet loss) across a collection of servers 140.

For example, the anomaly detection alert 300 can include a first region 310 that identifies a first server (a server 140 at a first location). The first region 310 can include information that indicates that the current resource utilization exceeds an expected threshold. Specifically, the information or message in the first region 310 can be generated in response to determining that the current amount of packet loss or resource utilization exceeds the threshold value output by the first, second, third, or fourth models or combination thereof and/or an upper bound provided by Equation 10. In some cases, the message in the first region 310 is provided in response to determining that a majority (e.g., 2 out of 3) data points indicating current packet loss exceed the threshold value output by the first, second, third, or fourth models or combination thereof and/or an upper bound provided by Equation 10.

The first region 310 includes a change resources option 314. In response to receiving input that selects the change resources option 314, the graphical user interface can be updated to present a window that includes information about the currently allocated resources of the server identified in the first region 310. The currently allocated resources can represent the current amount of packet loss, amount of packet loss experienced in a past given time interval, current amount of memory, bandwidth and processing resources allocated to a given service or application of the server identified in the first region 310. Input may be received to increase any one of the resources that are shown to the operator. For example, the operator may choose to increase the bandwidth and processing resources that are made available to the given service to reduce the amount of packet loss experienced by the given service on the server 140. In some cases, a recommended set of changes to the resources can be generated automatically and the user can select an option to accept the recommended changes to address the anomaly.

As another example, the anomaly detection alert 300 includes a second region 320 that identifies a second server (a server 140 at a second location). The second region 310 includes information that indicates that the current resources allocated to a given application or service are predicted to result in packet loss that exceeds a forecasted or predicted threshold. Specifically, the information or message in the second region 320 can be generated in response to determining that a load or packet loss that will likely be experienced by a server 140 based on currently allocated resources to a given service will exceed the threshold value output by the first, second, third, or fourth models or combination thereof and/or an upper bound provided by Equation 10. A change resources option can be similarly provided for the second region 320 to allow the operator to change the resources that will be allocated to a service or application on the server identified in the second region 320 in the future.

Figure 4:
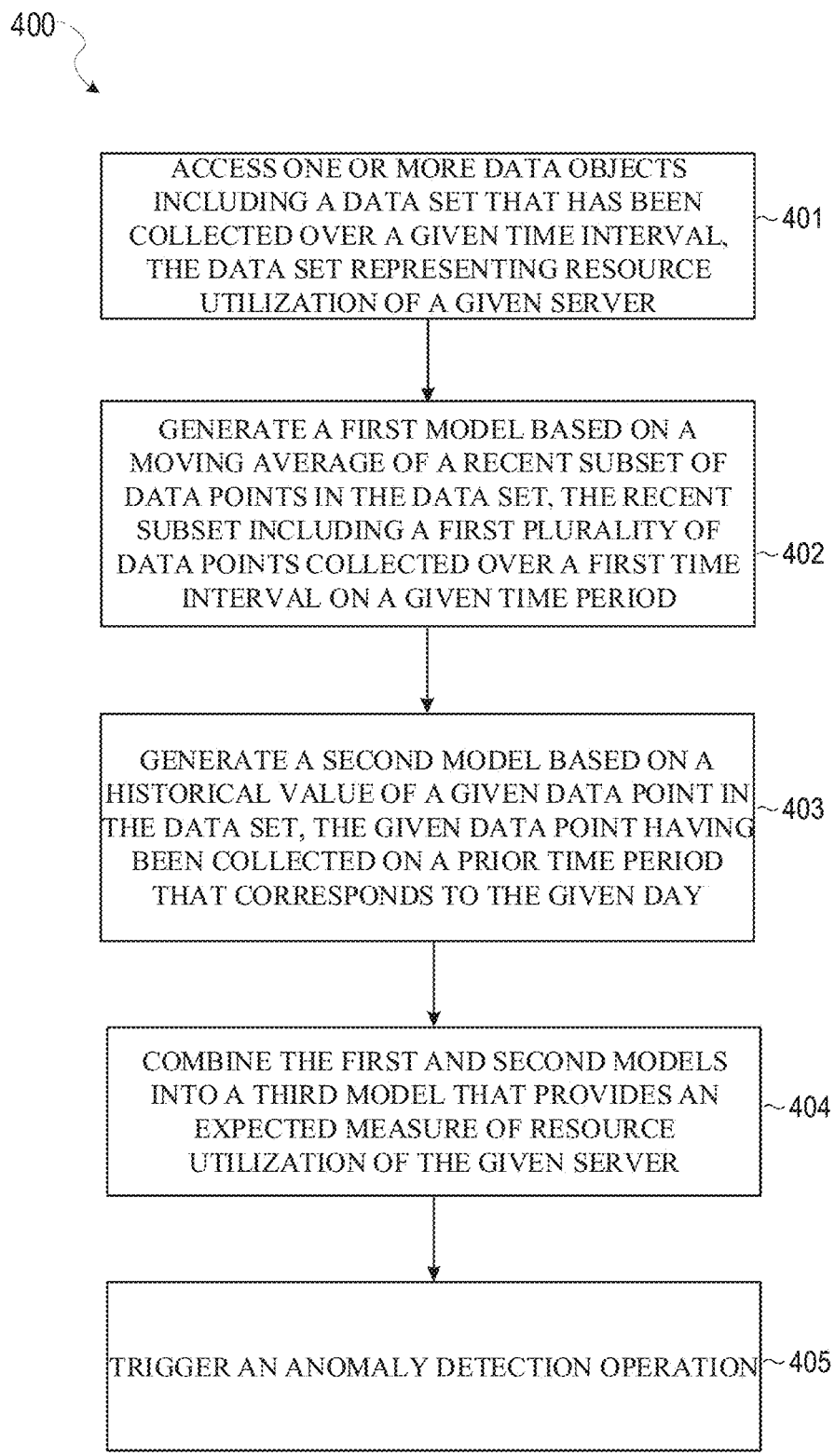
FIG. 4 is a flowchart illustrating example operations of the anomaly detection system, according to example embodiments.

FIG. 4 is a flowchart illustrating example operations of the anomaly detection system 150 in performing process 400, according to example embodiments. The process 400 may be embodied in computer-readable instructions for execution by one or more processors such that the operations of the process 400 may be performed in part or in whole by the functional components of the system 100; accordingly, the process 400 is described below by way of example with reference thereto. However, in other embodiments, at least some of the operations of the process 400 may be deployed on various other hardware configurations. Some or all of the operations of process 400 can be in parallel, out of order, or entirely omitted.

At operation 401, the anomaly detection system 150 accesses one or more data objects including a data set that has been collected over a given time interval, the data set representing resource utilization of a given server. For example, the anomaly detection system 150 collects data that represents packet losses across one or more of the servers 140.

At operation 402, the anomaly detection system 150 generates a first model based on a moving average of a recent subset of data points in the data set, the recent subset including a first plurality of data points collected over a first time interval on a given time period (e.g., given day). For example, the anomaly detection system 150 generates a first model that represents data packet losses that occurred within the past hour and quarter hour on a given day.

At operation 403, the anomaly detection system 150 generates a second model based on a historical value of a given data point in the data set, the given data point having been collected on a prior time period (e.g., prior day) that corresponds to the given time period. For example, the anomaly detection system 150 generates a second model that represents data packet loss that occurred at the same time on a prior day or the same day on a prior week.

At operation 404, the anomaly detection system 150 combines the first and second models into a third model that provides an expected measure of resource utilization of the given server. For example, the anomaly detection system 150 computes an average of the first and second models.

At operation 405, the anomaly detection system 150 triggers an anomaly detection operation. For example, the anomaly detection system 150 presents the anomaly detection alert 300 on a user interface of the database operator device 120.

Figure 5:
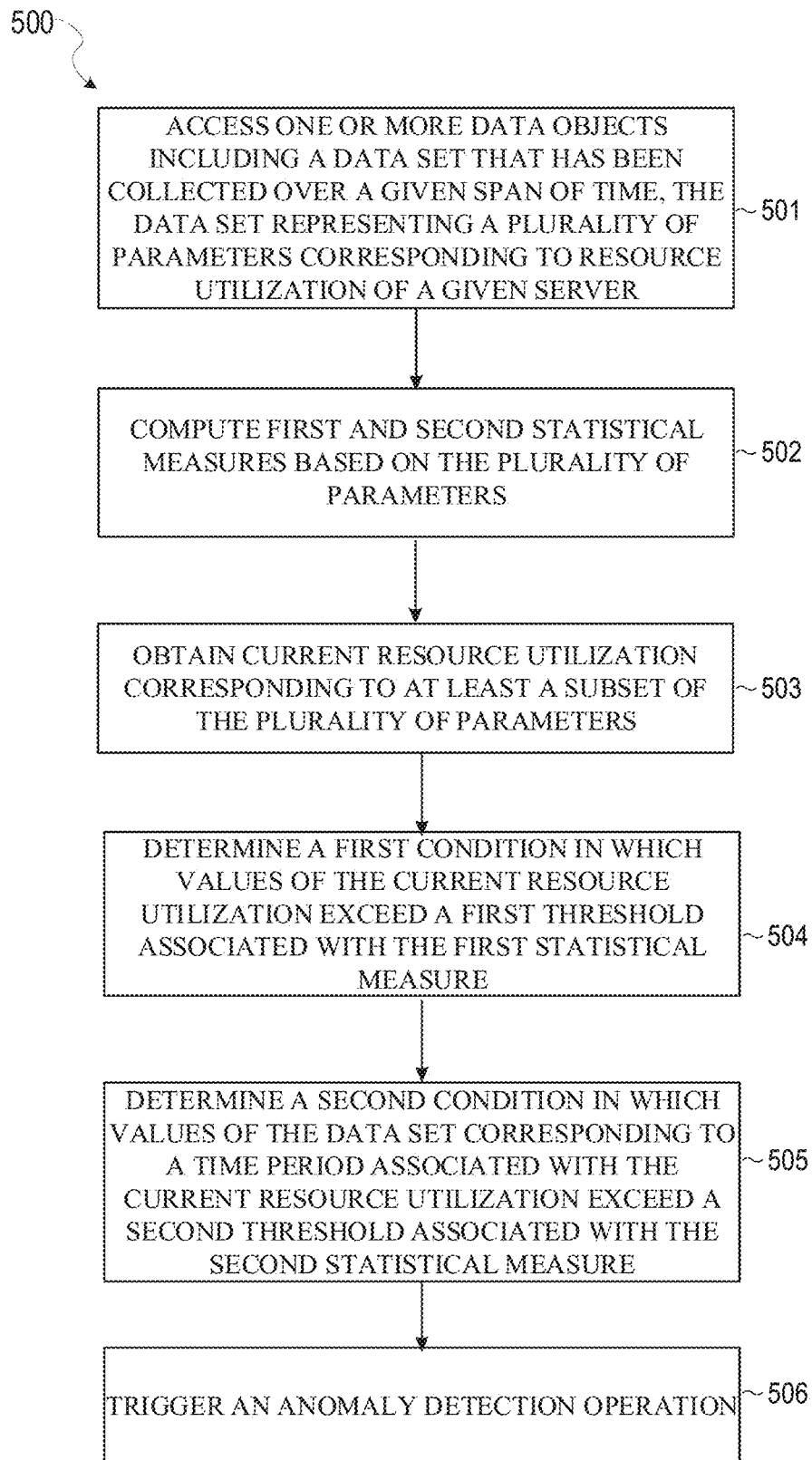
FIG. 5 is a flowchart illustrating example operations of the anomaly detection system, according to example embodiments.

FIG. 5 is a flowchart illustrating example operations of the anomaly detection system 150 in performing process 500, according to example embodiments. The process 500 may be embodied in computer-readable instructions for execution by one or more processors such that the operations of the process 500 may be performed in part or in whole by the functional components of the system 100; accordingly, the process 500 is described below by way of example with reference thereto. However, in other embodiments, at least some of the operations of the process 500 may be deployed on various other hardware configurations. Some or all of the operations of process 500 can be in parallel, out of order, or entirely omitted.

At operation 501, the anomaly detection system 150 accesses one or more data objects including a data set that has been collected over a given span of time, the data set representing a plurality of parameters corresponding to resource utilization of a given server. For example, the anomaly detection system 150 collects data that represents TCP Throughput, Packet Loss, and Round Trip Times across one or more of the servers 140.

At operation 502, the anomaly detection system 150 computes first and second statistical measures based on the plurality of parameters. For example, the anomaly detection system 150 can compute a first statistical measure comprising one or more quantiles of each of the plurality of parameters across the given span of time. The anomaly detection system 150 can compute a second statistical measure comprising one or more of one, two or three standard deviations of each of the plurality of parameters across the given span of time.

At operation 503, the anomaly detection system 150 obtains current resource utilization corresponding to at least a subset of the plurality of parameters. For example, the anomaly detection system 150 obtains one or more of a first set of values corresponding to a first parameter of the plurality of parameters; a second set of values corresponding to a second parameter of the plurality of parameters; and a third set of values corresponding to a third parameter of the plurality of parameters.

At operation 504, the anomaly detection system 150 determines a first condition in which values of the current resource utilization exceed a first threshold associated with the first statistical measure. For example, the anomaly detection system 150 determines that at least two of first, second and third sets of values of the current resource utilization exceed respective standard deviations associated with the first statistical measure.

At operation 505, the anomaly detection system 150 determines a second condition in which values of the data set corresponding to a time period associated with the current resource utilization exceed a second threshold associated with the second statistical measure. For example, the anomaly detection system 150 retrieves historical data for the plurality of parameters from the data set corresponding to the same time on a prior day or the same day on a prior week as the current time or day associated with the current resource utilization. The anomaly detection system 150 determines that differences between each of the historical data points associated with the respective parameters and respective medians exceed respective median absolute deviation values.

At operation 506, the anomaly detection system 150 triggers an anomaly detection operation. For example, the anomaly detection system 150 presents the anomaly detection alert 300 on a user interface of the database operator device 120.

Figure 6:
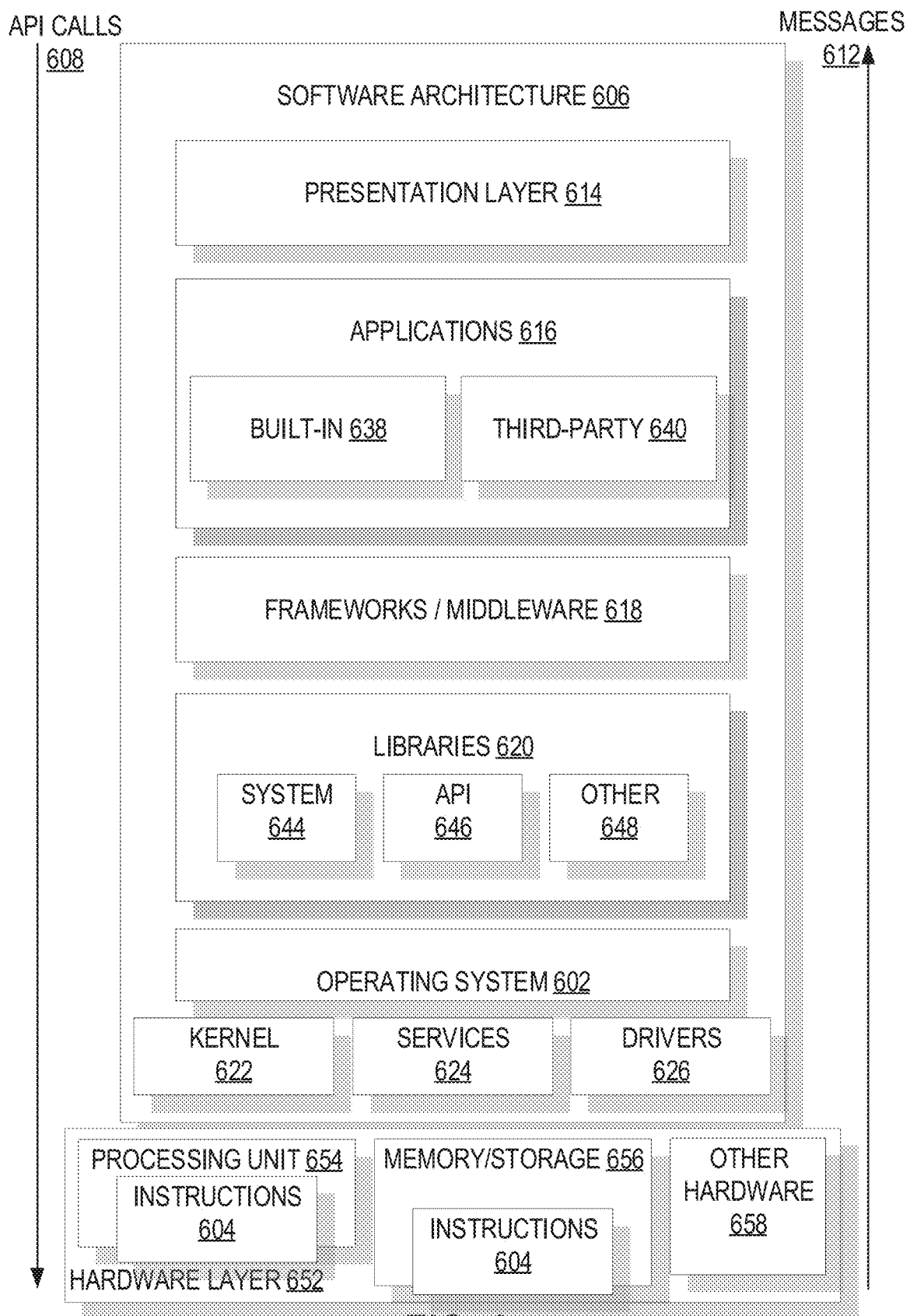
FIG. 6 is a block diagram illustrating an example software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and input/output (I/O) components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage devices memory/storage 656, which also have executable instructions 604. The hardware layer 652 may also comprise other hardware 658. The software architecture 606 may be deployed in any one or more of the components shown in FIG. 1 or 2.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/devices.

The frameworks/middleware 618 (also sometimes referred to as middleware) provide a higher-level common infrastructure that may be used by the applications 616 and/or other software components/devices. For example, the frameworks/middleware 618 may provide various graphic user interface functions, high-level resource management, high-level location services, and so forth. The frameworks/middleware 618 may provide a broad spectrum of other APIs that may be utilized by the applications 616 and/or other software components/devices, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
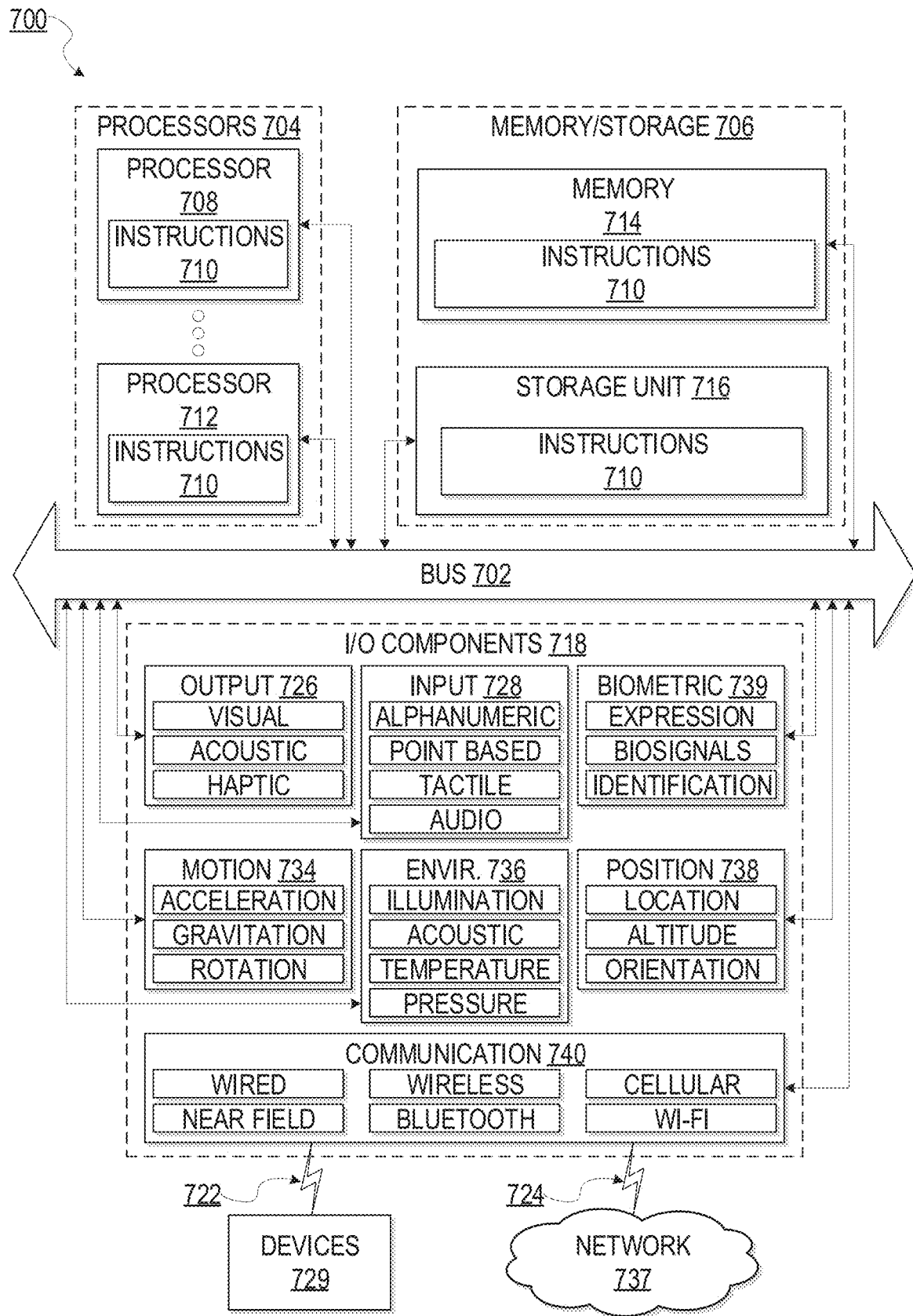
FIG. 7 is a block diagram illustrating components of a machine, according to some example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed.

As such, the instructions 710 may be used to implement devices or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 708 and a processor 712 that may execute the instructions 710. The term "processor" is intended to include multi-core processors 704 that may comprise two or more independent processors (sometimes referred to as "cores") that may execute instructions contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory/storage 706 may include a memory 714, such as a main memory, or other memory storage, database 110, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on, such as devices 132a-b, 133a-b, and 134a-b. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 739, motion components 734, environmental components 736, or position components 738 among a wide array of other components. For example, the biometric components 739 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 737 or devices 729 via coupling 724 and coupling 722, respectively. For example, the communication components 740 may include a network interface component or other suitable device to interface with the network 737. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 729 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a LAN, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

Changes and modifications may be made to the disclosed embodiments without departing from the scope of the present disclosure. These and other changes or modifications are intended to be included within the scope of the present disclosure, as expressed in the following claims.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
   accessing, by one or more processors, one or more data objects including a data set that has been collected over a given span of time, the data set representing resource utilization of a given server;
   generating a first model based on a moving average of a subset of data points in the data set, the subset of data points including a first plurality of data points collected over a first time interval for a given time period;

generating a second model based on a historical value of a given data point in the data set, the given data point having been collected on a prior time period that corresponds to the given time period;

combining, at least in part, the first and second models into a third model that provides an expected measure of resource utilization of the given server; and triggering an anomaly detection operation in response to determining that current resource utilization of the given server fails to correspond to the expected measure of resource utilization of the given server.

2. The method of claim 1, wherein the resource utilization includes network packet loss.

3. The method of claim 1, wherein the given span of time corresponds to a 90-day period.

4. The method of claim 1, wherein the given time period is one or more 24-hour time periods.

5. The method of claim 1, wherein each data point in the data set represents resource utilization over a ten-minute interval.

6. The method of claim 1, wherein the given data point represents resource utilization one week prior to the given time period.

7. The method of claim 1, wherein the first time interval corresponds to one hour.

8. The method of claim 1, wherein generating the first model comprises applying a first exponential smoothing parameter to the moving average.

9. The method of claim 8, wherein generating the second model comprises applying a second exponential smoothing parameter to the historical value.

10. The method of claim 9, wherein the first exponential smoothing parameter and the second exponential smoothing parameter each correspond to a value of 15 percent.

11. The method of claim 1, further comprising generating the third model based, at least in part, on an average of the first and second models.

12. The method of claim 1, wherein the first, second, and third models are generated for a plurality of servers across a plurality of locations.

13. The method of claim 1, further comprising:
computing a deviation factor based on an average deviation of the data set and a median deviation of the data set;
computing a range of variation in a collection of data points captured during a second time interval on the given time period; and
computing an average of variation in the collection of data points.

14. The method of claim 13, further comprising:
computing an upper bound for the resource utilization based on the deviation factor, the range of variation, and the average of variation; and
computing a lower bound for the resource utilization based on the deviation factor, the range of variation, and the average of variation.

15. The method of claim 14, wherein the upper bound is computed as a function of a median value at a given point in time combined with a maximum of the deviation factor, the range of variation, and the average of variation, and wherein the lower bound is computed as a function of a difference between the median value at the given point in time and a minimum of the deviation factor, the range of variation, and the average of variation.

16. The method of claim 14, further comprising:
generating a fourth model that forecasts the expected measure of resource utilization of the given server, wherein the fourth model provides as the expected measure the lower bound during a first set of time intervals in the given time period, and wherein the fourth model provides as the expected measure a minimum of the upper bound and a sum of the lower bound with an output of the third model.

17. The method of claim 14, further comprising:
computing a difference between the upper bound and the current resource utilization for a most recently collected set of data points; and
triggering the anomaly detection operation in response to determining that a majority of the differences exceed a threshold value.

18. The method of claim 1, further comprising adjusting an amount of resources available on the given server at a future time based on an output of the third model.

19. The method of claim 1, wherein the anomaly detection operation comprises transmitting a notification to an operator that identifies the given server on which the anomaly has been detected.

20. A system comprising:
one or more processors coupled to a memory comprising non-transitory computer instructions that, when executed by the one or more processors, perform operations comprising:
accessing one or more data objects including a data set that has been collected over a given span of time, the data set representing resource utilization of a given server;
generating a first model based on a moving average of a subset of data points in the data set, the subset of data points including a first plurality of data points collected over a first time interval for a given time period;
generating a second model based on a historical value of a given data point in the data set, the given data point having been collected on a prior time period that corresponds to the given time period;
combining, at least in part, the first and second models into a third model that provides an expected measure of resource utilization of the given server; and
triggering an anomaly detection operation in response to determining that current resource utilization of the given server fails to correspond to the expected measure of resource utilization of the given server.

21. A non-transitory computer readable medium comprising non-transitory computer-readable instructions for performing operations comprising:
accessing one or more data objects including a data set that has been collected over a given span of time, the data set representing resource utilization of a given server;
generating a first model based on a moving average of a subset of data points in the data set, the subset of data points including a first plurality of data points collected over a first time interval for a given time period;
generating a second model based on a historical value of a given data point in the data set, the given data point having been collected on a prior time period that corresponds to the given time period;
combining, at least in part, the first and second models into a third model that provides an expected measure of resource utilization of the given server; and triggering an anomaly detection operation in response to determining that current resource utilization of the given server fails to correspond to the expected measure of resource utilization of the given server.

\* \* \* \* \*